United States Patent [19]

Metz

[11] Patent Number: 4,709,777

[45] Date of Patent: Dec. 1, 1987

[54] VEHICLE POWER DOOR LOCKS, IGNITION KEY INTERLOCK SYSTEM THEREFOR

[75] Inventor: Marcus C. Metz, Canton, Mich.

[73] Assignee: Chrysler Motors Corporation, Highland Park, Mich.

[21] Appl. No.: 882,656

[22] Filed: Jul. 7, 1986

[51] Int. Cl.⁴ .......................................... B60K 28/00
[52] U.S. Cl. .................................. 180/286; 180/289; 340/52 D
[58] Field of Search .................. 180/286, 289; 340/64, 340/52 D; 307/10 R, 10 AT

[56] References Cited

U.S. PATENT DOCUMENTS

| | | | |
|---|---|---|---|
| 3,703,704 | 11/1972 | Schiesterl et al. | 340/64 |
| 4,223,296 | 9/1980 | Kim et al. | 340/52 D |
| 4,427,967 | 1/1984 | Maiocco | 340/52 D |
| 4,428,024 | 1/1984 | Mochida et al. | 180/289 |
| 4,572,320 | 2/1986 | Robbins, Jr. | 180/289 |
| 4,593,544 | 6/1986 | Claar et al. | 180/289 |

Primary Examiner—John J. Love
Assistant Examiner—Ross Weaver
Attorney, Agent, or Firm—Wendell K. Fredericks

[57] ABSTRACT

An interlocking circuit for inhibiting a vehicle power door locks from locking when an ignition key is left in the ignition key cylinder. The power door locks are precluded from locking if the ignition key is left in the OFF, ACCESSORY or IGN-RUN positions.

6 Claims, 1 Drawing Figure

VEHICLE POWER DOOR LOCKS, IGNITION KEY INTERLOCK SYSTEM THEREFOR

BACKGROUND OF THE INVENTION

1. Field of the Invention

This invention relates to power door lock circuits for motor vehicles and more specifically to circuits of the type which inhibit locking power door locks when a key is left in the ignition and provides an audible indication when keys are left in the ignition and there is an attempt to exit the vehicle.

2. Description of the Prior Art

In automobiles with power door locks, ignition keys have been locked in vehicles because the power door operator has been able to actuate the power door locks upon exiting from the vehicle, often locking the keys in the vehicle. If this is done with all the windows closed, the operator will be unable to reach in and actuate the unlock switch so that he can retrieve his keys.

In some vehicles, an audible warning is given when keys are left in the vehicle when an attempt is made to leave the vehicle. Such systems generally employ dedicated networks used specifically for providing a warning to the operator that the keys have been left in the ignition switch key receptacle. Usually such systems, besides being costly, require additional electrical circuits and components.

Realizing the problems associated with cost in providing a system which would prevent the power doors from being locked when keys are left in the ignition, a search for various other means which could be integrated into an existing power door lock system was initiated. This search resulted in the improved key and door interlock system of the present invention.

BRIEF SUMMARY OF THE INVENTION

The present invention relates to circuits for inhibiting the power door locks from locking when the ignition key is left in the key receptacle of the vehicle. In particularly these circuits are suitable for incorporating in tilt-steering column vehicles wherein the ignition key-in switch in the key cylinder is not effective for indicating the presence or absence of the ignition key if the key is rotated to the run position.

The circuits of this invention is integrated into an existing, electric power door lock system such that the conventional buzzer warning is activated if the driver exits the vehicle through the driver door while the ignition key is in the key cylinder; the lock function of the power door locks is inhibited if an attempt to lock the power door locks is made; and if the driver tries to actuate the power door locks, the vehicle horn will turn ON. Also, if the vehicle is exited via the passenger door, as in most vehicles, the buzzer warning is not activated but in this embodiment the power door locks are inhibited and any attempt to activate the power door locks will cause the horn to turn ON, the circuit arrangement of this invention may be integrated into vehicles such as those with power door locks having either tilt or non-tilt steering columns.

BRIEF DESCRIPTION OF THE DRAWING

The accompanying drawing, which is incorporated in and constitutes a part of this specification illustrates a preferred embodiment of the invention and, together with the description, serves to explain the principles of the invention.

DETAILED DESCRIPTION OF A PREFERRED EMBODIMENT

Figure 1:
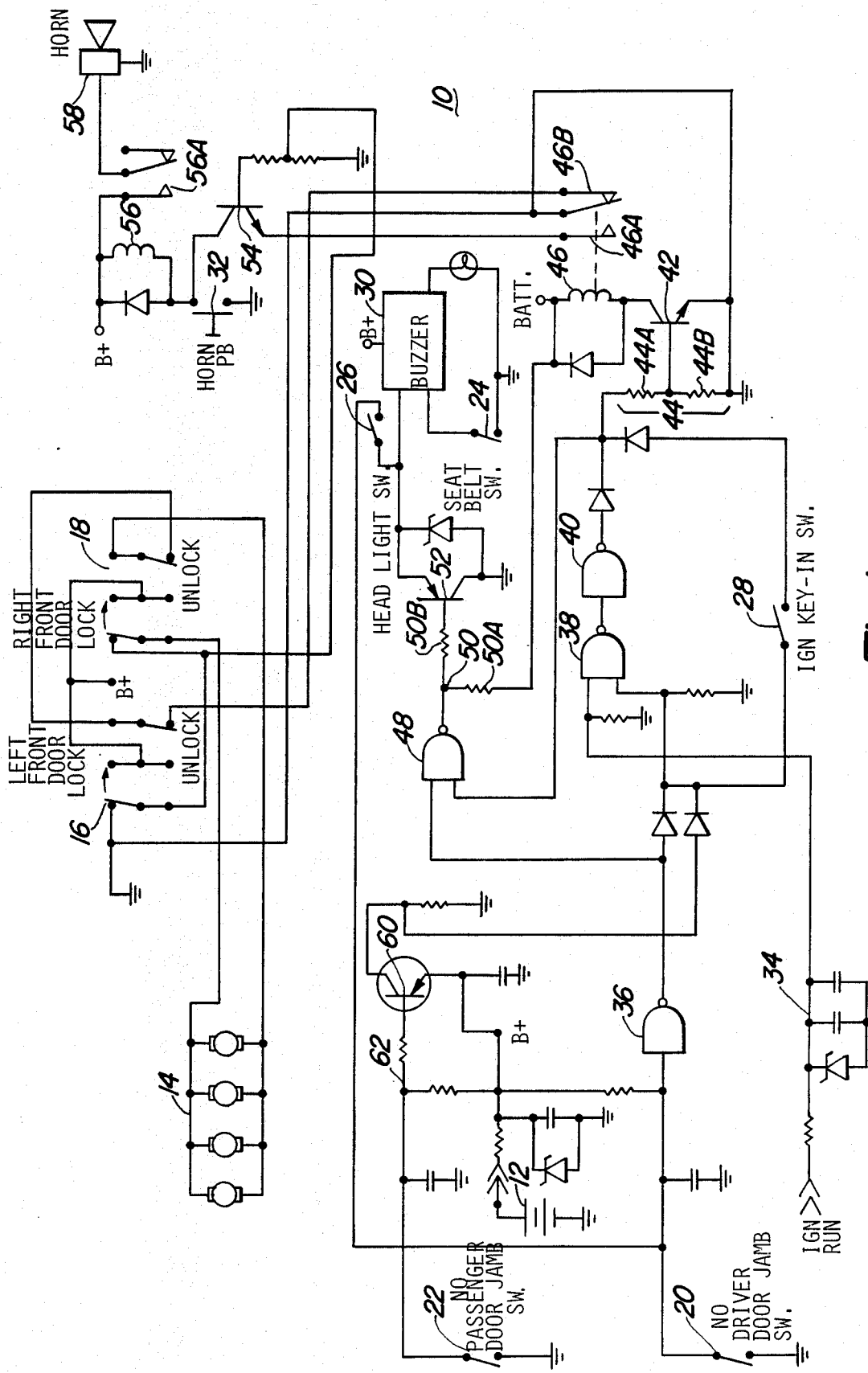
FIG. 1 is a schematic diagram of a preferred embodiment of the ignition key interlock system for a vehicle with power door locks.

FIG. 1 is a schematic diagram of the power door lock system 10. There, power is supplied to the system from vehicle battery 12. This battery power is also supplied to the IGN RUN signal line providing B+ and ground.

System 10 includes door lock latches (not shown) which are mechanically linked to electric reversible locking motors 14—14. Left front door lock/unlock switch 16, the driver's door switch, and right front door lock/unlock switch 18, the passenger door switch are used to actuate locking motor 14—14 to lock or unlock the door latches of the vehicles.

Driver door jamb switch 20 and passenger door jamb switch 22 which are normally open when the respective doors are closed, are used to provide electric signals indicative of the status of the door, i.e., whether either door is open or closed.

Seat belt switch 24 which is mounted in a seat buckle (the buckle not shown), a normally closed switch opens when the buckle is hooked; head light switch 26 usually a more than one circuit switch mounted on an instrument panel, shown here as a single pole single-throw normally open switch; and ignition key-in switch 28, mounted in a steering column of the vehicle, a normally open switch, are switches that are usually used to prompt a buzzer 30 or an electronic voice alert module (not shown) to respond to warn the driver or passenger that he hasn't buckled his seat belt or his headlights are on or his ignition key is in the steering column key receptacle.

Horn pushbutton switch 32 mounted on the steering column is a momentary-action switch used in most cases for sounding a warning to pedestrians and other drivers while driving the vehicle.

An ignition switch (not shown—the ignition key-in switch is shown) is a conventional automobile type ignition switch having "OFF", "RUN", "START" or "CRANK", and "ACCESSORY" positions. The key cylinder is normally spring biased to automatically return to the "RUN" position from "START" position on the release of the ignition key after cranking the engine. When an engine "RUN" condition is achieved, voltage from the IGN RUN circuit is generated. This voltage is limited by voltage limiting circuit 34 before being applied to system 10.

If the engine is not running, power is supplied to system 10 via battery 12. The interlock system of the present invention is designed to prevent an operator from getting out of his car and leaving the keys in the ignition.

If the IGN KEY-IN switch 28 is closed, indicative of a key being in the ignition and the driver door is opened, the normally open driver door jamb switch 20 will close initiating several reactions. Buzzer 30 will go on, the lock button circuits of lock/unlock switches 16 and 18 will become inoperative preventing the doors from being locked, and if the lock buttons of lock/unlock switches 16 and 18 are pressed, horn 58 will go on. Horn 58 will go off when the lock buttons are released. This action occurs irrelevant of whether the ignition switch is in ON, ACCESSORY or OFF position.

However, If IGN KEY-IN switch 28 is closed and only the passenger door is opened, the lock buttons of lock/unlock switches 16 and 18 will become inactive preventing the doors from being locked; if the lock buttons of switches 16 and 18 are pressed, horn 58 will go on; but buzzer 30 will not go on such as was the case when the driver door is opened. These reactions provide an audible reminder to the driver and/or passenger that the keys are in the ignition key cylinder.

Both the above mentioned driver and passenger door reactions occur irrelevant of whether the steering column is a tilt or a non-tilt column. Also, these reactions occur even if in a tilt column vehicle, the vehicle door is opened while the key is left in the run position.

To explain the logic which supports the above reactions, first look at the case of the driver door being open with the key being in the ignition. key cylinder of a non-tilt column vehicle. In a non-tilt column vehicle, the IGN KEY-IN switch 28 is active in all IGN KEY cylinder positions. But in the tilt column vehicles of this embodiment, if the key is accidently left in the RUN position, the IGN KEY-IN switch 28 has no effect. Driver door jamb switch 20 will close applying a low to the input of NAND gate 36. The inverted output of gate 36 is applied to the divider circuit 44 via IGN KEY-IN swtich 28 to provide base current to NPN transistor 42 which turns it on. When transistor 42 turns on, relay 46 is energized and the normally open contacts 46A close grounding the emitter of NPN transistor 54. With the emitter grounded, if the lock button of either lock/unlock switch 16 or 18 is pressed, base current will be applied to transistor 54 turning it on and, in turn, energizing relay 56 which connects horn 58 to B+ turning it on. Upon releasing the lock button, base current is removed and transistor 54 is cut off. Also, when relay 46 energizes, normally closed contact 46B opens breaking continuity between B+, the lock motors 14 and ground if and when a lock button of either lock/unlock switch 16 or 18 is pressed.

The same inverted output of gate 36 is applied directly to one input of NAND gate 48 and via the IGN KEY-IN switch 28 to another input of gate 48. If the ignition is on or running, the output of gate 36 will be applied in duplicate to the other input of gate 48 via NAND gates 38 and 40. This occurs since IGN RUN signal will apply a high to one input of gate 38 and gate 36 will supply a high to another input of gate 38. The inverted output of gate 38 is applied to the input of gate 40 causing a high to be duplicated at the other input of gate 48.

The inverted output of gate 48 is applied to the bias circuit 50 to cause base current to PNP transistor 52 turning it on which, in turn, turns buzzer 30 on.

If only the passenger door is opened with the IGN KEY-IN switch 28 closed, the buzzer 30 is bypassed. The closed passenger door jamb switch 22 will ground the base bias circuit 62 which will cause base current to flow from PNP transistor 60 turning it on. Turned on transistor 60 applies base current to transistor 42 via IGN KEY-IN switch 28 turning on transistor 42. When transistor 42 turns on, the lock buttons of lock/unlock switches 16 and 18 are inhibited from energizing lock motors 14, but are enabled for turning on transistor 54 which, when on, energizes relay 56 which turns horn 58 on.

If a tilt column vehicle is exited either through the driver door or the passenger door and the ignition key is accidently left in the ignition key cylinder while the ignition key is positioned to IGN RUN, even though the engine is not running, the high logic level signal of IGN-RUN is routed to NAND gates 38 and 40 as previously explained. This activates the buzzer if the driver door is opened, inhibits locking the power door locks and enables the horn to turn on in response to actuating the power door locks.

This interlock circuit does not interfere with normal operations of horn 58 which is normally activated by pushbutton 32 or normal operation of buzzer 30 which is operated by other switches, such as head light switch 26 and seat belt switch 24. CMOS logic gates and voltage level circuits can be employed to practice this invention.

While a preferred embodiment of the present invention has been shown and described, it will be obvious to those skilled in the art that various modifications and substitutions may be made without departing from the spirit of the invention which is to be limited only within the scope of the appended claims.

I claim:

1. An interlock system for an automotive vehicle with power door locks for preventing the accidental locking of the vehicle while the ignition key is in an ignition key cylinder, the vehicle being either the type having a tilt or non-tilt steering column, the ignition key cylinder being the type wherein the ignition key is positioned to the OFF, ACCESSORY or IGN-RUN position without starting or causing an engine of the vehicle to operate, said system comprising:
   a. means for detecting the presence of the ignition key positioned in the ignition key cylinder in the OFF and ACCESSORY positions;
   b. means for detecting the presence of the ignition key positioned in the ignition key cylinder in the IGN-RUN position;
   c. driver door jamb switch circuit means mechanically connected to a driver door of the vehicle for providing an electrical signal to the system indicative of the driver door being opened;
   d. driver door audible indication means connected to said driver door jamb switch circuit means, said ignition key in IGN-RUN position detection means and said ignition KEY-IN in position detection means for providing an audible sound when the driver door is opened while the ignition key is in the IGN-RUN, OFF and ACCESSORY positions;
   e. passenger door jamb switch circuit means mechanically connected to a passenger door of the vehicle for providing an electrical signal to the system indicative of the passenger door being opened;
   f. means for inhibiting the power door lock circuits in response to the passenger door and/or the driver door being opened while the ignition key is positioned in the ignition key cylinder in the ON, OFF or ACCESSORY position; and
   g. vehicle horn activation means for turning on the vehicle horn in response to the power door locks being inhibited by said power door lock inhibiting means.

2. Apparatus in accordance with claim 1 wherein said means for detecting the presence of the ignition key positioned in the OFF or ACCESSORY position is a normally open single-pole KEY-IN switch disposed in the ignition key cylinder so as to close upon the entry of the ignition key, said switch having a movable contact connected to both the passenger and driver door jamb switch means and a stationary contact connected to a first input of said driver door audible indication means and to an input of said power door lock inhibiting means.

3. Apparatus in accordance with claim 2 wherein said KEY-IN switch provides an indication of the presence of the ignition key in all positions with the exception of IGN-RUN.

4. Apparatus in accordance with claim 3 wherein said key in IGN-RUN position detecting means includes a voltage limiting circuit connected to an IGN-RUN voltage source, and a pair of NAND gates, wherein a first NAND gate of said pair of NAND gates has an input terminal connected to an output of said voltage limiting circuit and has another input terminal connected to both said passenger and said driver door jamb switch circuit means wherein another of said NAND gates of said pair of NAND gates has an input terminal connected to an output terminal of said first NAND gate and an output terminal connected to the first input of said driver door audible indication means and to an input of said power door lock inhibiting means.

5. Apparatus in accordance with claim 4 wherein said driver door audible indication means includes a two-input NAND gate, a bias network, a transistorized switch circuit and a vehicle buzzer, said NAND gate having an output terminal connected to an input of bias network, said bias network having an output connected to an input of said transistorized switch circuit, said transistorized switch circuit having an output connected to said vehicle buzzer, said two-input NAND gate having a first input connected to an output of said driver door jamb switch circuit circuits means and a second input connected to an output of both said ignition key in IGN-RUN position detection means and said ignition KEY-IN switch means, said two-input NAND gate providing a high logic level signal to said bias network turning on said transistorized switch circuit which turns on said buzzer in response to a high logic level output signal from said driver door jamb switch circuit means and a high logic level output signal from either or both of said ignition key in IGN-RUN position detection means and said ignition KEY-IN switch means.

6. Apparatus in accordance with claim 5 wherein said power door lock inhibiting means includes a single pole, double throw relay circuit which when activated connects a locking circuit of the power door locks to a horn circuit enabling the vehicle horn to be actuated by a lock button of the power door locks and which disconnects the power door lock locking circuit from an electric reversible locking motor circuit.

* * * * *